(12) United States Patent
Griffiths et al.

(10) Patent No.: US 12,362,833 B2
(45) Date of Patent: Jul. 15, 2025

(54) OPTICAL TRANSMITTER FOR A QUANTUM KEY DISTRIBUTION SYSTEM

(71) Applicant: Kabushiki Kaisha Toshiba, Tokyo (JP)

(72) Inventors: Benjamin Griffiths, Cambridge (GB); Robert Ian Woodward, Cambridge (GB); James F. Dynes, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 18/174,766

(22) Filed: Feb. 27, 2023

(65) Prior Publication Data
US 2024/0048242 A1  Feb. 8, 2024

(30) Foreign Application Priority Data
Aug. 2, 2022 (GB) .................. 2211255

(51) Int. Cl.
*H04B 10/50* (2013.01)
*H04B 10/508* (2013.01)
*H04L 9/08* (2006.01)

(52) U.S. Cl.
CPC ......... *H04B 10/503* (2013.01); *H04B 10/508* (2013.01); *H04L 9/0858* (2013.01)

(58) Field of Classification Search
None
See application file for complete search history.

(56) References Cited

U.S. PATENT DOCUMENTS

| 11,223,419 | B1 | 1/2022 | Pittaluga et al. | |
| 2006/0222180 | A1* | 10/2006 | Elliott | H04L 9/0852 380/278 |
| 2006/0262930 | A1* | 11/2006 | Dinu | H04L 9/0858 380/256 |
| 2008/0273703 | A1* | 11/2008 | LaGasse | H04L 9/0852 380/278 |

(Continued)

FOREIGN PATENT DOCUMENTS

| GB | 2525501 B | 5/2016 |
| GB | 2540589 A | 1/2017 |

(Continued)

OTHER PUBLICATIONS

Brassard, "Multi-user quantum key distribution using wavelength division multiplexing", Proceedings of SPIE vol. 5260 Applications of Photonic Technology 6, (SPIE, Bellingham, WA, 2003) (Year: 2003).*

(Continued)

*Primary Examiner* — Darren E Wolf
(74) *Attorney, Agent, or Firm* — Oblon, McClelland, Maier & Neustadt, L.L.P.

(57) ABSTRACT

An optical transmitter for a Quantum Key Distribution (QKD) system, the transmitter comprising: a multi-modal laser; a wavelength tuneable laser arranged to inject light into a cavity of the multi-modal laser, so as to cause the multi-modal laser to output light at a selected wavelength for use in generating pulses to be output by the transmitter; and a modulator for controlling a phase shift between successive pulses output from the transmitter.

17 Claims, 12 Drawing Sheets

(56) References Cited

U.S. PATENT DOCUMENTS

| | | | |
|---|---|---|---|
| 2014/0314108 A1* | 10/2014 | Anandarajah | H01S 5/4006 372/20 |
| 2016/0047643 A1 | 2/2016 | Yuan et al. | |
| 2019/0393962 A1 | 12/2019 | Zhang et al. | |
| 2021/0028865 A1* | 1/2021 | Figueroa | H04B 10/70 |
| 2021/0399810 A1* | 12/2021 | Li | H04B 10/2513 |
| 2022/0014362 A1* | 1/2022 | Djordjevic | H04B 10/70 |
| 2022/0247558 A1* | 8/2022 | Kronberg | H04L 9/0852 |

FOREIGN PATENT DOCUMENTS

| | | |
|---|---|---|
| JP | 2016-42694 A | 3/2016 |
| WO | WO 2013/037819 A1 | 3/2013 |

OTHER PUBLICATIONS

Paraiso, T. et al. "Advanced Laser Technology for Quantum Communications (Tutorial Review)". Advanced Quantum Technologies. Oct. 2021;4(10):2100062. (24 pages).

Barry, L.P. et al. "Optical Pulse Generation at Frequencies up to 20 GHz Using External-Injection Seeding of a Gain-Switched Commercial Fabry-Perot Laser". IEEE Photonics Technology Letters. Sep. 2001;13(9):1014-6. (3 pages).

Japanese Office Action issued Feb. 6, 2024 in Japanese Patent Application No. 2023-023728 (with unedited computer-generated English translation), 6 pages.

Extended European Search Report issued Dec. 19, 2023 in European Patent Application No. 23158546.4, 11 pages.

Eriksson et al., "Wavelength division multiplexing of continuous variable quantum key distribution and 18.3 Tbit/s data channels", Communications Physics, vol. 2, No. 1, Dec. 1, 2019, 8 pages, XP 055818486.

* cited by examiner

OPTICAL TRANSMITTER FOR A QUANTUM KEY DISTRIBUTION SYSTEM

FIELD

Embodiments described herein relate to an optical transmitter for a Quantum Key Distribution (QKD) system.

BACKGROUND

Quantum key distribution is a quantum communication technology for generating perfectly random quantum keys between two remote nodes known as Alice and Bob (A and B). These keys can then be used for data encryption to ensure secure communications. The basic operating principle of QKD relies on encoding and measuring quantum states that are encoded into conjugate bases; that is by measuring in one basis, no information can be determined about the other basis. Therefore, if an eavesdropper, typically known as Eve, were to intercept the signal, they would only reliably be able to correctly guess up-to 50% of the encoded bases (assuming that each basis is chosen evenly). Crucially, if Eve were to try to send the signals on to the original nodes after having measured the signals, errors would be detected when Alice and Bob compared their data. These errors would then alert Alice and Bob to the presence of Eve, due to the fact that Eve's measurement has fundamentally altered the states that were sent.

QKD can be implemented using any quantum object, however photons are most commonly used due to the fact they are bosons and therefore interact very weakly with the environment. This means they can travel long distances and at high speed.

To achieve secure QKD using photons, the photons need to be prepared into single photon Fock states. However, single photon sources generally have low send rates so only low bit rates can be achieved. In contrast, laser pulses can be achieved at several GHz, allowing for a much faster secure bit rate. By attenuating the laser beam, pulses of coherent laser light can be obtained in which the mean photon number per pulse is equal to or less than 1. The pulses follow a statistical Poissonian distribution in terms of photon number, but by ensuring a low enough mean photon flux, the rate of multiphoton events can be minimised. The decoy state technique can then be used to eliminate the potential impact of any multiphoton pulses that could otherwise lead to a photon-number splitting attack.

Information encoding for QKD is often achieved by using a pulse carving technique whereby both the intensity and phase of the output from a continuous wave laser source are modulated using a chain of intensity and phase modulators. If a tuneable laser is used as the laser source, the pulse carving technique can be used to achieve wavelength tuneable optical pulses with phase control over a large wavelength range (>100 nm); such an arrangement can then be used to implement a wavelength tuneable QKD transmitter. FIG. 1 shows an example of a transmitter 100 as may be used in such a QKD system. The transmitter 100 comprises a tuneable CW laser 101, the output of which is input to an intensity modulator 103 in order to generate a sequence of pulses. A phase modulator 105 is then used to modulate the phase of the pulses. A variable optical attenuator (VOA) 107 serves to attenuate the beam and ensure that the mean photon number per pulse is less than or equal to 1.

An advantage of the arrangement shown in FIG. 1 is that the laser 101 can be operated in continuous wave (CW) operation. However, in order to attain the level of extinction required for QKD, it is often necessary to provide multiple intensity modulators 103 and phase modulators 105 in series, making the overall system bulky and expensive. Moreover, such modulators 103, 105 are also often implemented using $LiNbO_3$ technology, which is incompatible with photonic integration and hence does not lend itself to large-scale manufacturing of QKD through photonic chip-compatible designs.

Modulator free QKD transmitters can be implemented by utilising injection seeding and gain switching techniques. An example of such an arrangement is shown in FIG. 2. In contrast to the arrangement shown in FIG. 1, the transmitter of FIG. 2 comprises two distributed feedback (DFB) lasers 201, 203 arranged in a master/slave setup. The two DFB lasers are pumped electronically, using a DC bias with an AC signal for modulating the gain of the laser cavity and driving it above and below the lasing threshold. Light output from the master DFB 201 is input to a circulator 205 and injected into the cavity of the slave DFB 203. The photons injected into the cavity cause the slave laser to seed via stimulated emission rather than spontaneous emission, thereby giving control over the phase of the light output by the slave laser. The output from the slave laser is then coupled back into the circulator before being passed through the VOA 207 as before, in order to ensure that the mean photon number per pulse remains less than or equal to 1.

One drawback of the modulator-free design shown in FIG. 2 is that it cannot be directly implemented with conventional tuneable laser sources. This is owing to the fact that conventional compact tuneable lasers do not exhibit good pulse performance from direct modulation i.e. they cannot generate GHz pulse trains and have lower modulation bandwidth. Typically, the novel structures that are employed in such lasers to achieve tunability negatively impacts on their pulse performance. For this reason, the modulator-free arrangement remains dependent on the use of lasers such as the DFBs shown in FIG. 2. DFB lasers are limited to a single emission wavelength by their internal structure, which contains a Bragg grating. As the internal physical structure of the laser does not allow other modes, the only wavelength tunability that can be achieved is through modulation of the temperature to expand/contract the cavity. This gives only minor wavelength tuning in the range of 1 nm, limited by the small thermal-induced changes and the fact that lasers have a finite temperature range over which they can be safely operated.

The lack of tunability afforded by systems such as that shown in FIG. 2 precludes their use in certain applications. For example, QKD protocols such as Measurement-Device Independent (MDI) QKD, which rely on sending information from two transmitters at remote nodes to a central node, often require challenging feedback loops such that the photons from the two remote nodes are coincident at the central node at the same time. If these states can be stored in a quantum memory, QKD can be achieved with different arrival times from each node. However, since quantum memories often have different excitation wavelengths to those used in QKD, the ability to tune the wavelength is essential to such systems. In another example, if a system is already utilising the laser's one available wavelength for classical communication traffic (quite common as the wavelength of most telecommunication systems lies in the C-band and most QKD systems are designed for the C-band), the lack of alternative wavelength(s) limit the opportunities to use the same system for QKD.

BRIEF DESCRIPTION OF DRAWINGS

Embodiments of the invention will now be described by way of example with reference to the accompanying drawings in which.

DETAILED DESCRIPTION

Figure 1:
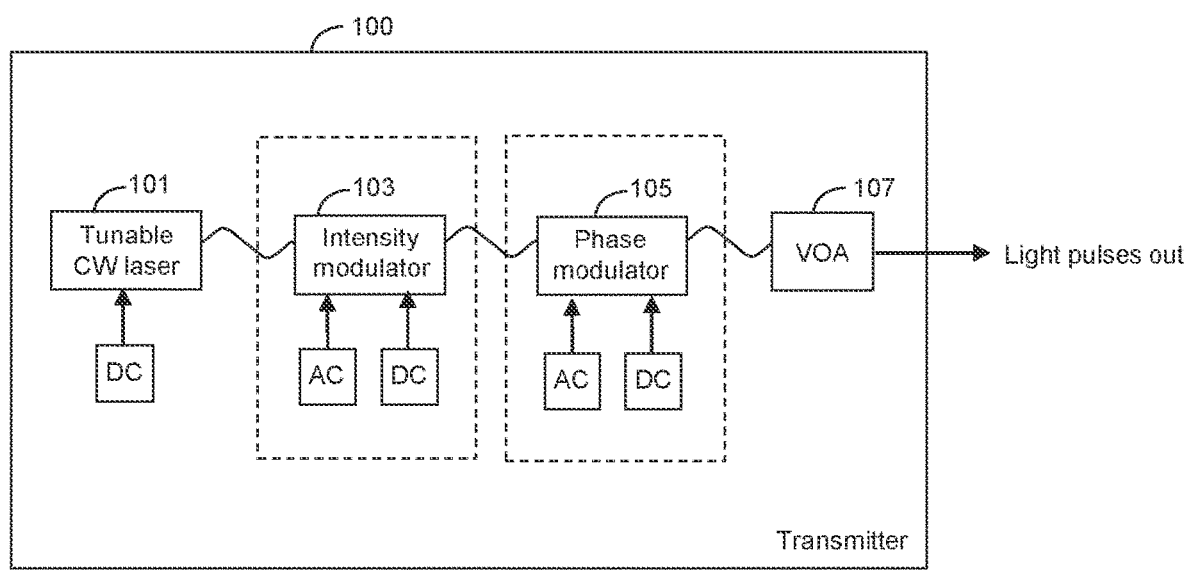
FIG. 1 shows a schematic of a QKD system comprising a conventional transmitter.

According to a first embodiment, there is provided an optical transmitter for a Quantum Key Distribution (QKD) system, the transmitter comprising:
a multi-modal laser;
a wavelength tuneable laser arranged to inject light into a cavity of the multi-modal laser, so as to cause the multi-modal laser to output light at a selected wavelength for use in generating pulses to be output by the transmitter; and
a modulator for controlling a phase shift between successive pulses output from the transmitter.

The multi-modal laser may be configured to generate the pulses of light for output by the transmitter.

The modulator may be configured to control the phase shift by modulating the pump power supplied to the wavelength tuneable laser.

The modulator may comprise an external modulator arranged to receive the pulses of light from the multi-modal laser and apply a phase shift to the pulses of light.

The multi-modal laser may be configured to generate pulses of light by modulating the pump power supplied to the multi-modal laser.

The pump power supplied to the multi-modal laser may be used to gain-switch the multi-modal laser.

The multi-modal laser and/or the wavelength tuneable laser may be solid-state lasers.

The multi-modal laser may comprise a Fabry Perot laser.

The optical transmitter may further comprise an attenuator for attenuating the output pulses, such that the mean number of photons per pulse is equal to or less than 1.

The transmitter may be configured to encode bits of information in pairs of optical pulses output by the transmitter, each pair of pulses being transmitted within a respective time window. The information may be encoded into the conjugate bases of time and phase or two phase bases.

The pulses output by the transmitter may be temporally encoded within each time window by modulating the pump power supplied to the multi-modal laser.

Within each time window, the pair of pulses may be phase encoded by applying a specified phase shift between the first pulse in the time window and the second pulse in the time window. The specified phase shift may be applied by modulating the pump power supplied to the wavelength tuneable laser by a pre-defined amount.

The optical transmitter may comprise an interferometer configured to split each pulse generated by the multi-modal laser into two pulses that travel down respective arms of the interferometer. One of the arms may comprise a delay for delaying one of the pulses with respect to the other pulse. One of the arms may comprises a phase modulator arranged to apply a phase shift to the pulse travelling down that arm.

For each time window, the phase of the first pulse in the temporal window may be randomised with respect to the previous time window.

The phase of the first pulse in each time window may be randomised with respect to the previous time window by gain switching the wavelength tuneable laser.

The phase of the first pulse in each time window may be randomised with respect to the previous time window by modulating the pump power supplied to the wavelength tuneable laser with a randomly chosen amplitude. The randomly chosen amplitude may be selected from one of 10 or more pre-defined amplitudes.

According to a second embodiment, there is provided a quantum key distribution (QKD) system comprising an optical transmitter according to the first embodiment.

The QKD system may comprise a receiver, wherein data is sent from the transmitter to the receiver across a network, the network comprising one of:
a point-to-point network;
a measurement device independent (MDI) network; and
a twin field (TF) network.

A different wavelength may be selected at different time intervals.

The QKD system may further comprise a quantum repeater, the quantum repeater comprising a node having a quantum memory, the quantum memory being arranged to receive the pulses of light output by the optical transmitter, wherein the selected wavelength is such as to match the resonant excitation of the quantum memory.

The system may comprise two optical transmitters, the quantum memory being arranged to receive the pulses of light output by both optical transmitters, each of the optical transmitters being configured to output pulses of light at the same selected wavelength.

The pulses output by the optical transmitter may be transmitted through the same network as light signals encoding other telecommunications data. The selected wavelength may be different from the wavelength of the light signals encoding the other telecommunications data.

The QKD system may be multiplexed with other QKD systems.

Embodiments described herein provide a light source capable of achieving modulator-free wavelength tuneable optical pulses with phase control. The light source can be used as a source in a wavelength tuneable QKD system, and may be utilized with any protocol in which information is encoded onto conjugate bases of time and phase or into two conjugate phase bases. The described embodiments can allow for a simpler, and more compact QKD system than conventional QKD schemes in which tunability is limited to very small wavelength ranges or where the use of many active components is required.

Figure 3:
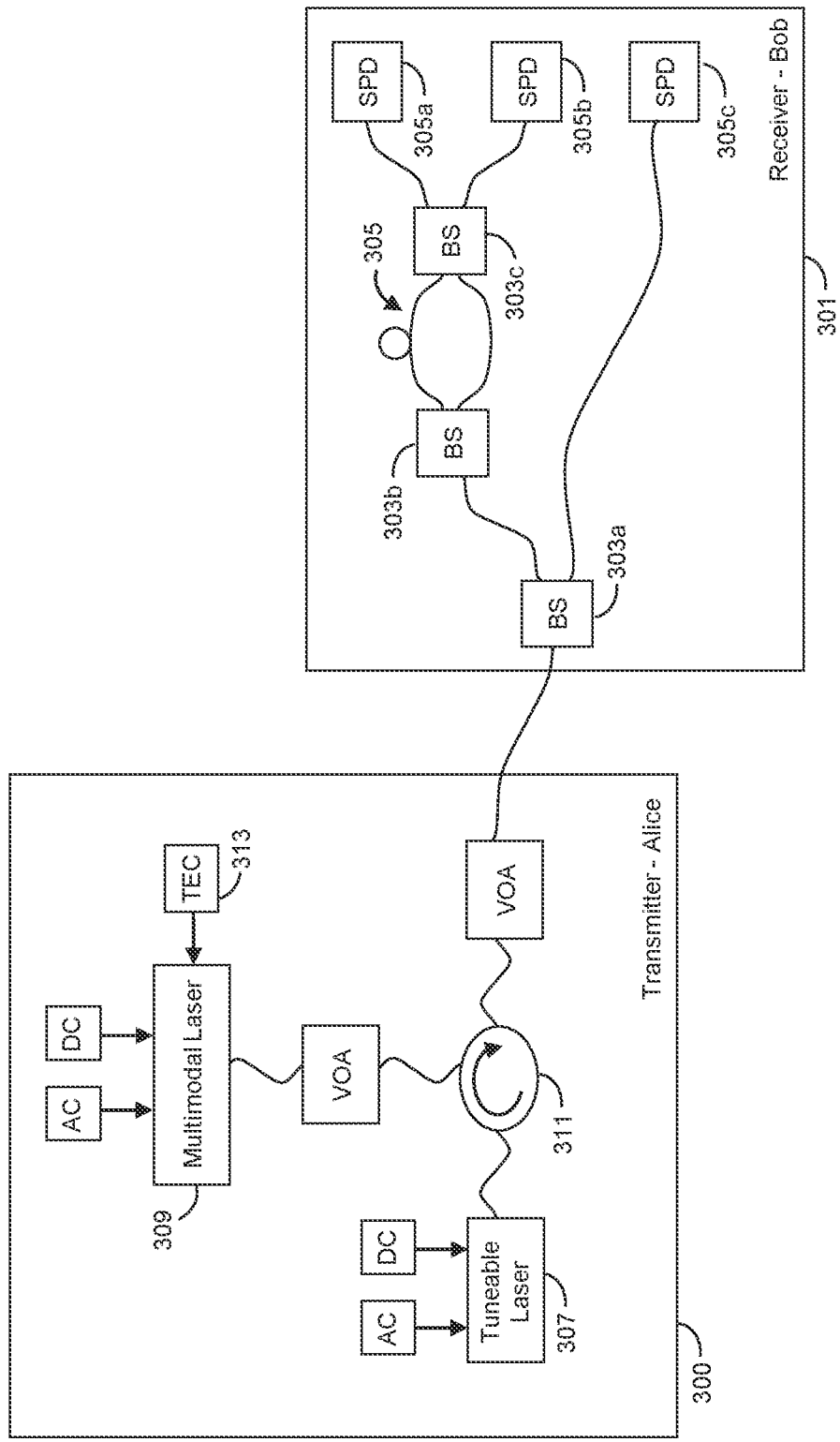
FIG. 3 shows a schematic of a QKD system comprising a transmitter according to an embodiment.

FIG. 3 shows a schematic of an optical transmitter 300 according to an embodiment. In this embodiment, the transmitter 300 is implemented as part of a point-to-point QKD system in which the light pulses output by the transmitter are used to encode information in conjugate bases, with the information being sent across a network to a receiver 301. The light pulses output by the transmitter may be transmitted through optical fibre or in free space. For telecommunications applications, the wavelength may be selected to be within the telecommunication C-band.

The receiver 301 comprises an arrangement of beam splitters (BS) 303a, 303b, 303c and single photon detectors (SPD) 305a, 305b, 305c used to decode the information sent by the transmitter. The information is decoded either by measuring the time of arrival of photons at one of the detectors, or by interfering consecutive pulses using a delay line in an asymmetric Mach Zehnder Interferometer 305. In the latter case, the phase difference between pulses will lead to constructive or destructive interference causing different ones of the detectors 305a, 305b to click.

Figure 2:
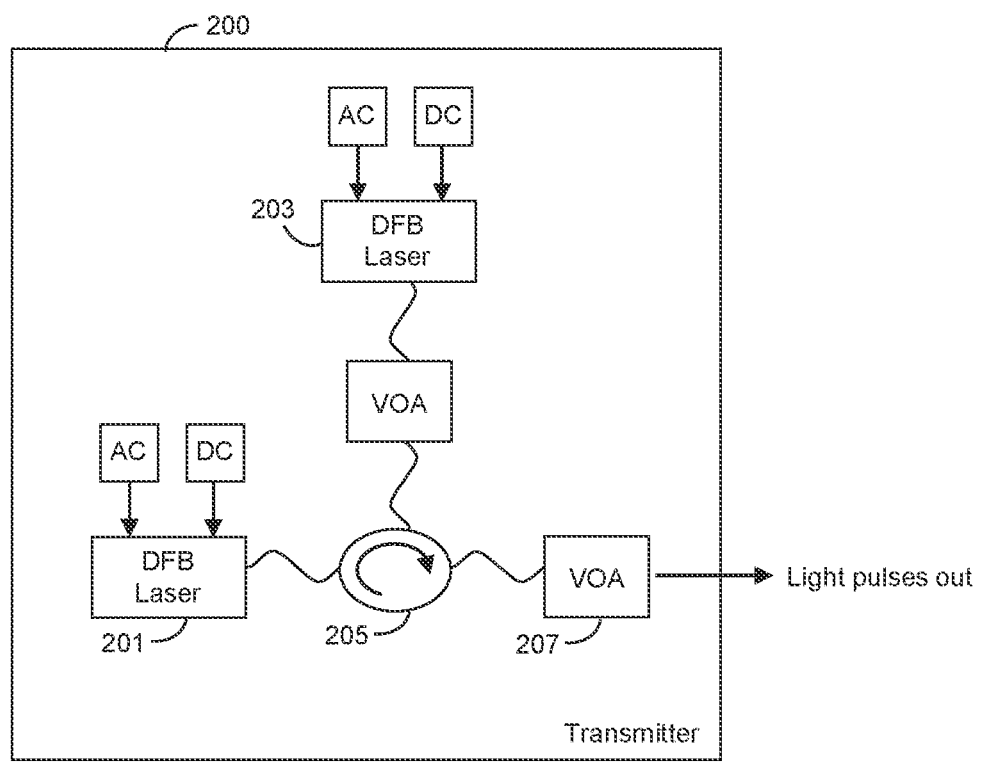
FIG. 2 shows a schematic of another QKD system comprising a conventional transmitter.

The components of the transmitter 300 are similar to the modulator free design shown in FIG. 2 but with different master and slave lasers.

In more detail, beginning with the master laser, in order to achieve wavelength tunability, the fixed wavelength DFB of FIG. 2 is replaced by a tuneable laser 307. The tuneable laser 307 may be any laser capable of lasing across a band of wavelengths, where that band is 10 nm or more in width. In some embodiments, the tuneable laser 307 may be capable of lasing across a 20 nm band of wavelengths, or more.

The tuneable laser 307 may be tuned using any one of a number of different means known in the art. As an example, tuning may be achieved through the use of heated ring resonators with slightly different free spectral range in the cavity to ensure stable single frequency operation by the Vernier effect.

The second modification to the system of FIG. 2 is to replace the single-mode slave laser by a multi-modal laser 309. The multi-modal laser is one whose cavity supports multiple cavity modes, such that the device is able to support lasing over a wide range of wavelengths. In some embodiments, the band of wavelengths over which the multi-modal laser is capable of lasing may be 50-100 nm in width.

Both the master and slave lasers may be solid state diode lasers. As in FIG. 2, the master and slave laser are both pumped electronically, each one having a DC bias and an AC input that can be used to modulate the gain of the laser and drive it above and below the lasing threshold. In the present embodiment, the multi-modal laser 309 comprises a Fabry Perot (FP) laser. The FP laser 309 is similar to a DFB laser but the laser cavity mirrors are defined as facets of the semiconductor gain chip (or external cavity mirrors), rather than a Bragg grating written directly into the gain medium.

Figure 4:
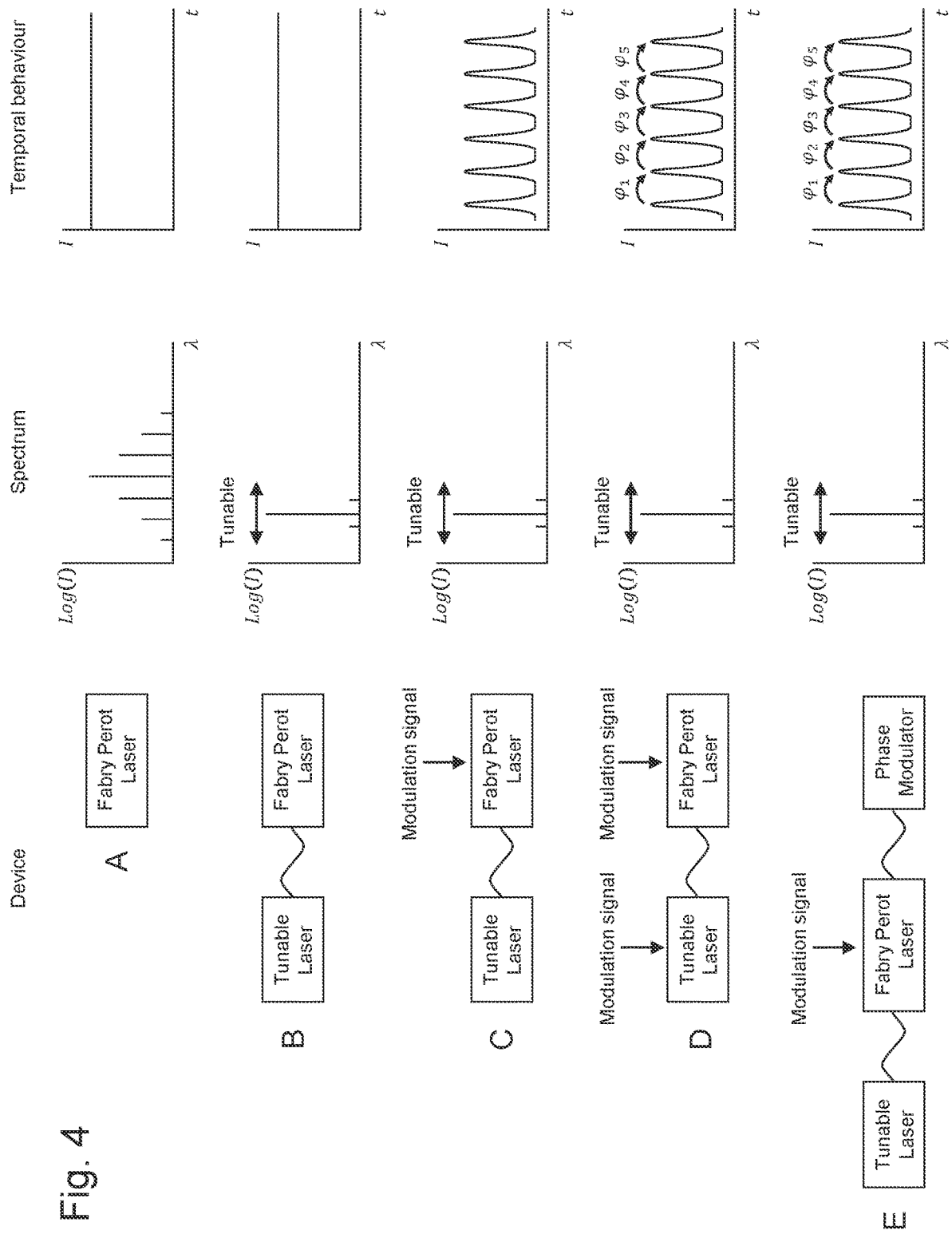
FIG. 4 shows an example of how by modulating the output of different components of a transmitter, the output of light pulses by the transmitter may be controlled according to an embodiment.

The function of the transmitter 300 shown in FIG. 3 can be further understood with reference to FIG. 4. FIG. 4A shows the multimodal output of a conventional FP laser diode operating in CW, whilst FIGS. 4B to 4E show how the output from the FP laser is modified by the addition of further components.

Referring to FIG. 4B, together with FIG. 3, the tuneable laser 307 is first tuned to a desired wavelength, and light from the tuneable laser 307 master laser is injected into the FP laser 309, using a circulator 311 as before. A thermoelectric coupler (TEC) 313 can be used to provide a small amount of temperature modulation of the FP laser 309 so as to allow for maximum overlap of the injected light to a particular mode of the FP laser cavity. Whereas FP lasers often lase on multiple cavity modes simultaneously, thereby giving a multimode output, the injection of seed photons at the chosen wavelength means that the mode that overlaps with that wavelength dominates the available gain, whilst other modes that are seeded only by spontaneous emission (i.e. vacuum fluctuations) are suppressed. In this way, injection locking with the tuneable master laser 307 enables a tuneable single mode in the FP cavity. In addition, the mode linewidth of the FP laser 309 is significantly reduced down to that of the master laser, with the use of injection seeding reducing the mode competition and the likelihood of mode-hopping.

Referring now to FIG. 4C, the FP laser 309 is gain switched by modulating the pump power using the AC input to the FP laser. By doing so, the FP laser 309 is now able to output wavelength tuneable coherent pulses at a high rate. As described in more detail below, the modulation in the pump power provided to the FP laser by the AC input can be used to encode temporal information in the pulses output from the transmitter 300. Injection locking the FP laser 309 also enhances the modulation bandwidth and reduces pulse chirp, leading to improved pulse performance.

The phase of the pulses output by the FP laser 309 will be set by the phase of the injected light. If a modulation is now applied to the master laser 307 using its AC signal input, it is possible to apply a phase shift between output pulses, as shown in FIG. 4D. In more detail, if the AC current supplied to the master laser 307 is modulated slightly, the relative phase of light emitted by the master laser 307 can be shifted due to a small change of the refractive index of the master laser cavity. This phase shift is passed onto the FP laser 309, allowing for a deterministic encoding of relative phase between pulses of the FP laser 309. In this way, the AC input to the master laser acts to modulate the phase of the pulses output from the transmitter 300.

Figure 5:
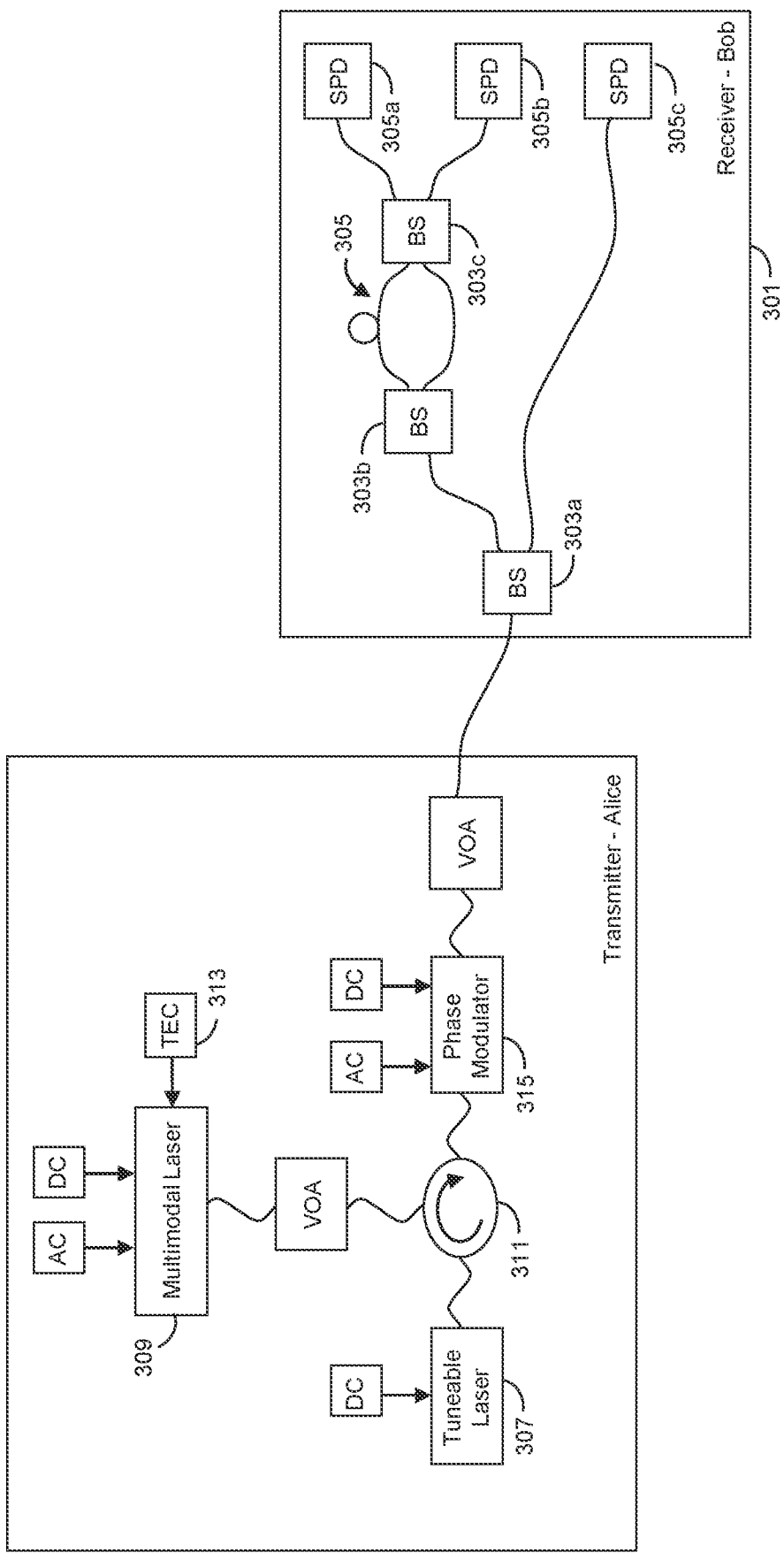
FIG. 5 shows a schematic of a QKD system comprising a transmitter according to an embodiment.

As an alternative to modulating the master laser 307, an external phase modulator can be used to encode the phase, as shown in FIG. 4E. FIG. 5 shows such an arrangement incorporated into the same QKD system as FIG. 3 (here, components having the same function as in FIG. 3 are labelled with the same numerals). In the embodiment shown in FIG. 5, an AC modulation is no longer applied to the master laser 307. Instead, an external phase modulator 315 is used to encode phase information. An advantage of the arrangement shown in FIG. 5 is that the master laser does not need to be modulated at high speed; the disadvantage is that an extra phase modulator 313 is required.

Figure 6:
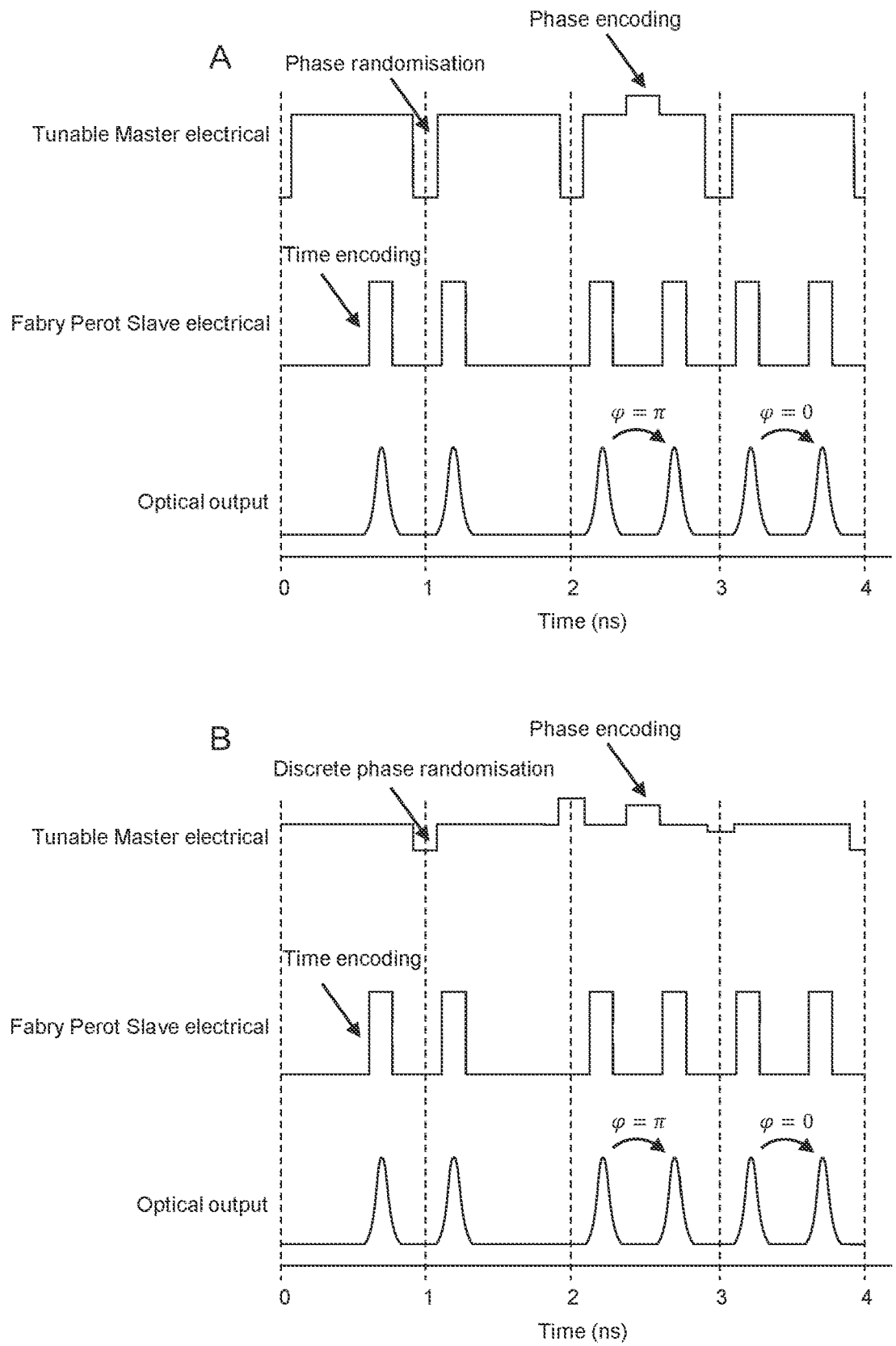
FIG. 6 shows an example of how the light pulses output by a transmitter may be used to encode temporal and/or phase information according to an embodiment.

The means by which the transmitter 300 may be configured to encode information in the output pulses can be explained with reference to FIG. 6. Referring first to FIG. 6A, this shows the amplitude of the electrical (pump) signal applied to both the master laser 307 (top line) and the FP slave laser 309 (middle line), together with the optical output of the FP slave laser (bottom line).

The information to be sent to the receiver is encoded temporally in a series of time windows, which in the present embodiment each have a 1 ns duration. A waveform generator or FPGA (not shown in the Figures) is used to generate a clock signal that defines the start of each time window. The clock signal is used to trigger the modulation in pump power applied to both the master laser and the slave laser. The master laser 307 is pulsed at the clock rate, whilst the slave laser 309 is pulsed at twice the clock rate. This means that within each time window, the slave laser 309 will generate up to two pulses, with each slave pulse being seeded by the light output by the master laser.

The AC modulation applied to the FP slave laser dictates whether or not a pulse of light is output by the transmitter at a particular moment in time, by determining whether or not the FP slave laser is above the lasing threshold. In the example shown in FIG. 6A, a single pulse is output in each of the first two time windows i.e. those spanning the periods 0-1 ns and 1 ns-2 ns, respectively. In the first time window, the modulation (increase) in pump power supplied to the FP slave laser appears towards the end of the time window, meaning that the pulse output by the transmitter also appears towards the end of that window. In contrast, in the second time window, the modulation (increase) in pump power supplied to the FP slave laser appears towards the start of the time window, meaning that the pulse output by the transmitter also appears towards the start of that window. In the third and fourth time windows, spanning 2 ns-3 ns and 3 ns-4 ns, respectively, the pump power supplied to the FP slave laser is increased twice in each time window, resulting in the output of two optical pulses in each window.

In order to maintain security, it is important that there is no information overlap between the pulse(s) output in each time window. To achieve this, the pulse(s) in each time window are phase randomized with respect to the pulse(s) in the previous time window. In the embodiment shown in FIG. 6A, phase-randomisation is achieved by gain-switching the master laser at the start of each time window; this has the effect that the master laser is seeded by spontaneous emission, meaning that the phase of each pulse output by the master laser is randomized with respect to the previous pulse output by the master laser. Since the photons injected into the FP laser cavity by the master laser cause the FP laser to seed via stimulated emission rather than spontaneous emission, the output of the FP laser will be coherent with that of the master laser; accordingly, the phase of the pulse(s) output by the slave laser in a respective time window will also be randomized with respect to the pulse(s) output by the slave laser in the previous time window.

Whilst the pulse(s) output within different windows will have random phases compared to one another, the relative phase of pulses within an individual time window can be controlled by again using the master laser. Since the master laser is pulsed once at the start of each time window, each pulse generated by the FP slave laser in a given time window will be seeded by the same pulse from the master laser and have the same phase. Thus, in the event that the FP slave laser generates two pulses within a time window, the two pulses will have a phase shift of zero between them; this is the case in the fourth time window of FIG. 6A, from 3 ns-4 ns. If a small modulation is applied to the master laser pump power in the interval between the two pulses, the relative phase of light emitted by the master laser 307 will be shifted due to a small change of the refractive index of the master laser cavity. Accordingly, the phase of the second pulse in the time window will be shifted with respect to the first pulse in the time window; this is the case shown in the third time window of FIG. 6A, from 2 ns-3 ns. The modulation that is applied to the pump power of the master laser during the interval between the two FP slave laser pulses can be carefully controlled so as to achieve a pre-defined shift in phase. In the example shown in FIG. 6A, the modulation is used to obtain a phase shift of $\pi$ between the two pulses in the third time window.

Accordingly, by controlling the modulations applied to both the master laser and the FP slave laser, information can then be encoded into either two different phase differences, as seen in the time intervals 2 ns-3 ns and 3 ns-4 ns, or through a phase difference and time by switching off one of the two slave pulses, as seen in the time intervals 0 ns-1 ns and 1 ns-2 ns.

FIG. 6B shows another example of how the information may be encoded in the pulses output by the transmitter. Here, the process is essentially the same as that described above in relation to FIG. 6A, the difference being in how the phase randomization between different time windows is achieved. In contrast to the example of FIG. 6A, where the master laser is gain switched at the beginning of each time window in order to achieve a shift in the phase of light output by the master laser, a random modulation is applied to the AC pump power of the master laser at the start of each window. As when modulating the AC pump power to obtain a phase shift between two pulses in the same time window, the modulation applied to the AC pump power acts to cause a change in the refractive index of the master laser cavity and in turn causes a shift in the phase of light output by the master laser. However, since the applied modulation has a random amplitude, the phase shift that results is also random—this then contrasts with the phase shift that is obtained between two pulses in the same time window, which is controlled by varying the amplitude of the pump power by a pre-defined (calibrated) amount.

To achieve a truly random modulation of the amplitude applied to the AC pump power of the master laser, a quantum random number generator (QRNG) may be used to attain the amplitude of these modulations. Alternatively, in other implementations, a true random number generator (TRNG) could be used. It can be shown that, in terms of ensuring that there is no information overlap between the pulses in successive time windows, randomly modulating the AC pump power supplied to the master laser between 10 discrete values of amplitude has the same effect as randomly modulating by an arbitrary value. The random number generator may also be used to determine which basis to encode in and which bit to send in that basis (i.e., early/late in the time basis or $0/\pi$ phase difference in the phase basis) in the same way as in conventional systems.

Figure 7:
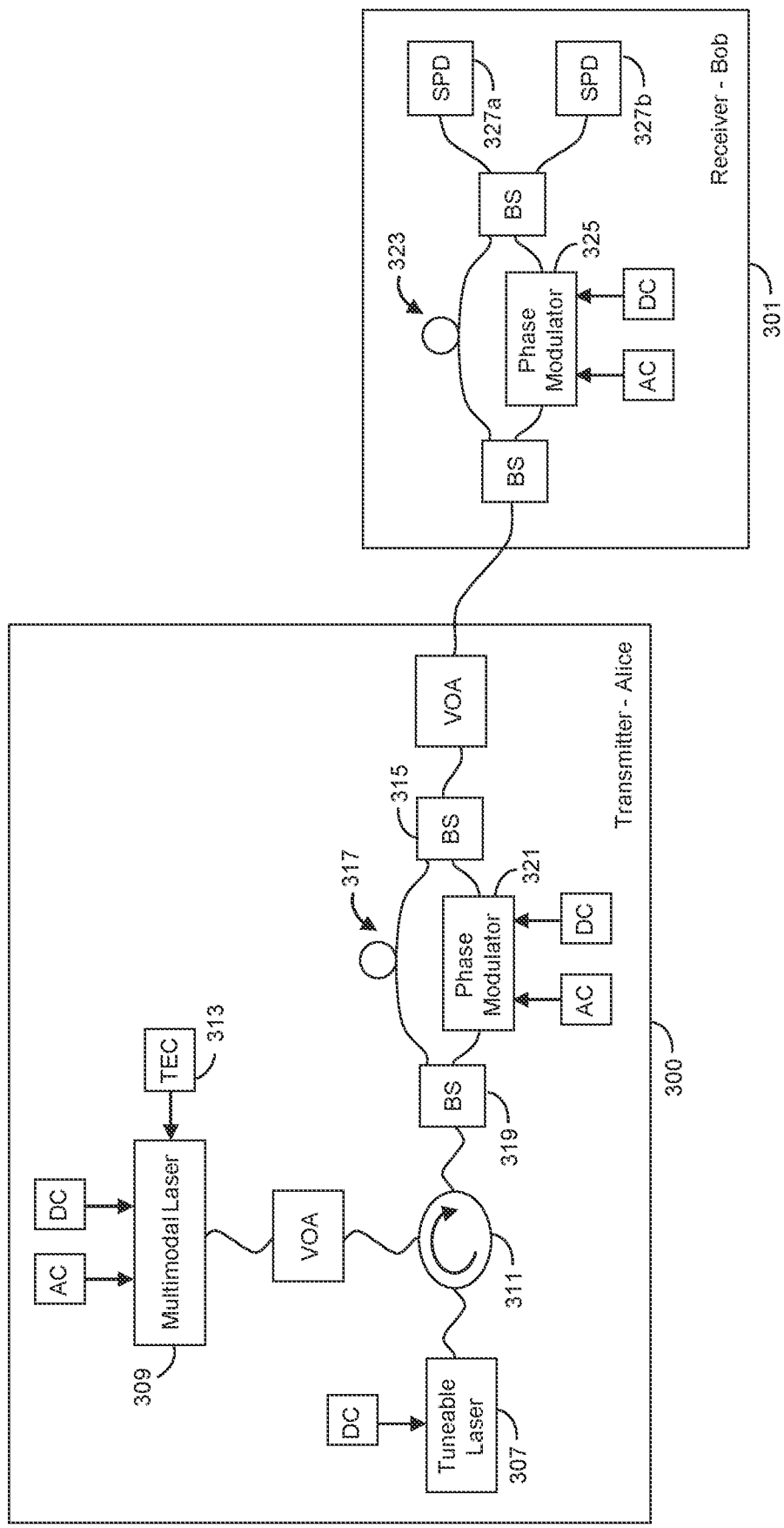
FIG. 7 shows a schematic of a QKD system comprising a transmitter according to an embodiment.

FIG. 7 shows an example of an optical transmitter 300 according to another embodiment. In this embodiment, the transmitter 300 includes an asymmetric Mach Zehnder interferometer 317 that is used to encode information in the light pulses output by the transmitter by modulating the phase of those pulses. The encoding scheme can be understood with reference to FIG. 8. As before, a waveform generator or FPGA (not shown in the Figures) is used to generate a clock signal that defines the start of each time window. The clock signal is used to trigger the modulation in pump power applied to both the master laser 307 and the multimodal slave laser 309. In this embodiment, both the master laser 307 and the slave laser 309 are pulsed at the clock rate. This means that within each time window, the slave laser 309 will generate a single pulse, with each slave pulse being seeded by the light output by the master laser 307.

Figure 8:
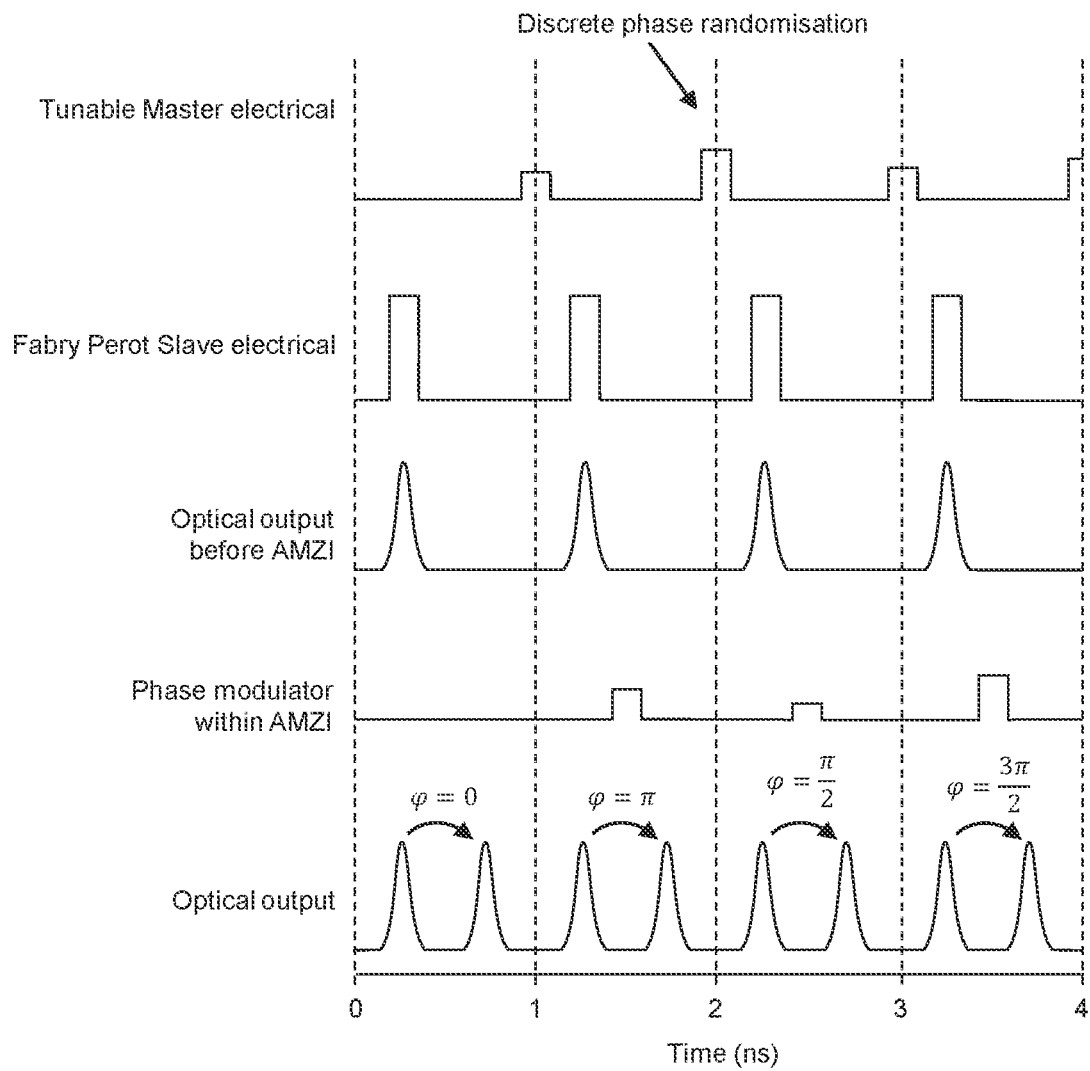
FIG. 8 shows a schematic of how the light pulses output by a transmitter may be used to encode phase information according to an embodiment.

Still referring to FIG. 8, a random modulation is applied to the AC pump power of the master laser at the start of each window; this then ensures that the phase of each pulse output by the master laser 307 is randomized with respect to the previous pulse output by the master laser. Since the photons injected into the multimodal laser cavity by the master laser 307 cause the multimodal slave laser 309 to seed via stimulated emission rather than spontaneous emission, the output of the multimodal slave laser 309 will be coherent with that of the master laser 307; accordingly, the phase of each pulse output by the multimodal slave laser 309 will be randomized with respect to the pulse output by the slave laser 309 in the previous time window.

The pulses output by the multimodal slave laser 309 are split via a beam-splitter 319 at the input to the AMZI and a delay is added to one arm of the AMZI. By splitting the pulse in two, and introducing a delay between those two pulses, the optical transmitter is configured to output two optical pulses in each time window. As discussed above, the phase of the first pulse in each time window is randomized with respect to the pulses in the previous time window. The phase difference between the two pulses within each time window is controlled through use of a phase modulator 321 that is applied to one arm of the AMZI, and which is used to encode phase in the X/Y bases. For example, the phase modulator may introduce a phase shift of 0, $\pi/2$ $\pi$, or $3\pi/2$, between the two pulses, as shown in FIG. 8.

In the embodiment shown in FIG. 7, the receiver 301 consists of another AMZI 323 with a phase modulator 325 on one arm and two single photon detectors 327a, 327b. The AMZI interferes the split pulses and the phase relationship leads to constructive or destructive interference, causing one of the two detectors 327a, 327b to click deterministically. Within the receiver, the phase modulator 325 allows switching between the X/Y bases (it will be appreciated that in any embodiment in which information is encoded into two phase bases rather than a single phase basis and a time basis, the receiver will include a phase modulator in the AZMI to switch between the two phase bases).

In the QKD systems shown in FIGS. 3, 5 and 7, the transmitter 300 will have wavelength tunability equal to the gain bandwidth of the slave laser 309 (assuming that the master laser is also capable of lasing across that same bandwidth). The transmitter may, therefore, have a tunability that spans 10 s of nm. The systems can be used with any wavelength, limited only by the availability of lasers with appropriate gain bandwidth. For example, InGaAsP semiconductor lasers are available around the telecoms C band, whilst other materials enable other wavelength ranges. Thus, the systems shown in FIGS. 3, 5 and 7 differ from conventional QKD systems in that the tunability of most sources used in those systems is limited to ~1 nm through temperature tuning.

Figure 9:
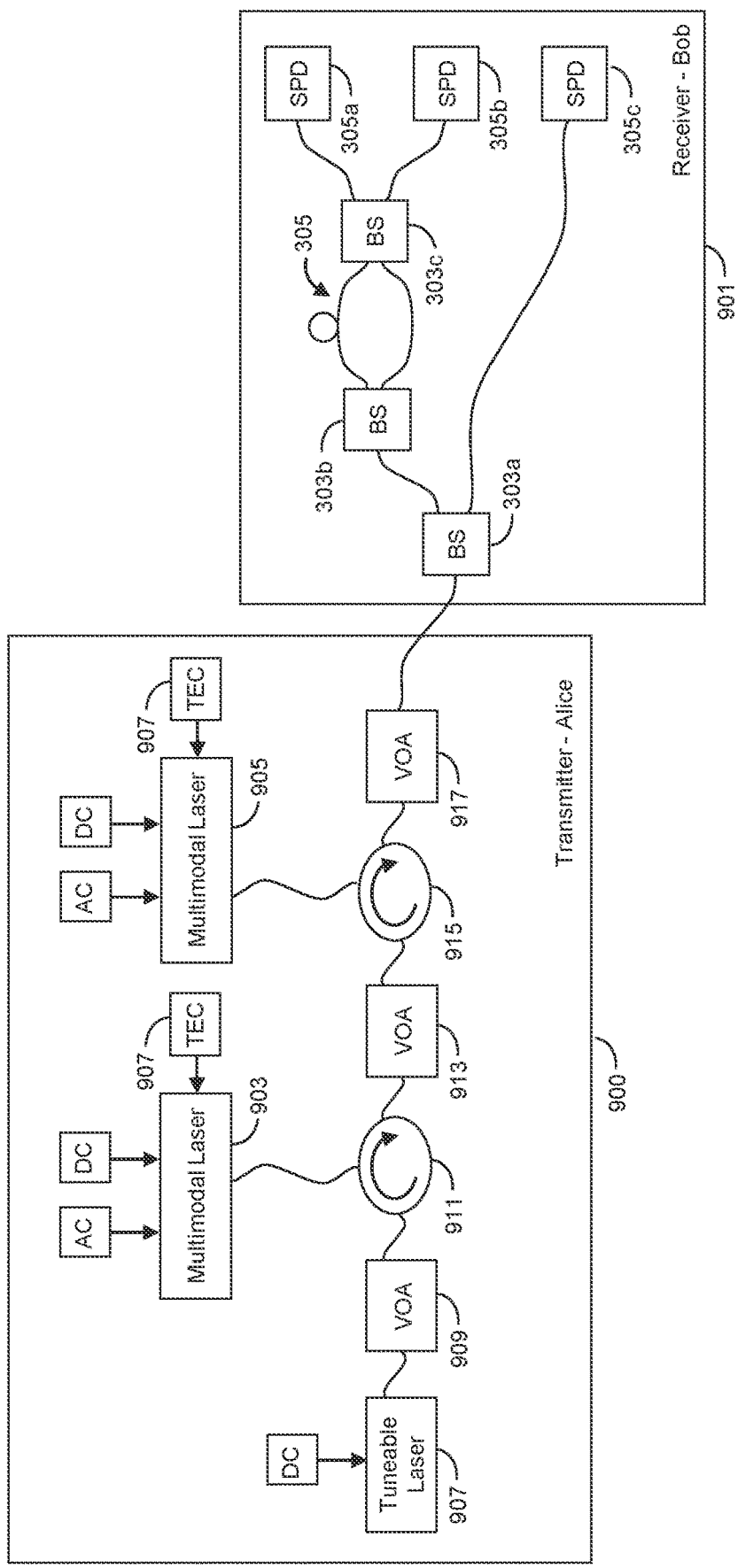
FIG. 9 shows a schematic of a QKD system comprising a transmitter according to an embodiment.

FIG. 9 shows an example of an optical transmitter 900 according to another embodiment. In this embodiment, the transmitter 900 includes a first multimodal laser 903 and a second multimodal laser 905. The first multimodal laser 903 and second multimodal laser 905 may both be Fabry Perot lasers, for example. Here, the tuneable laser 907 operates in continuous wave (CW) with a DC bias only. Light from the tuneable CW laser 907 passes through a first VOA 909 and to a first circulator 911. The light is in turn injected into the first multimodal laser 903, so as to select a single mode of the first multimodal laser 903 and define the output wavelength of the first multimodal laser 903. The light output by the first multimodal laser 903 returns through the first circulator 911 to a second VOA 913 and onto a second circulator 915 from where it is injected into the second multimodal laser 905. The output from the second multimodal laser 905 returns through the second circulator 915 to a third VOA 917, before being output by the transmitter 900.

It will be observed that, unlike in previous embodiments, the (first) multimodal laser 903, whilst receiving the light from the wavelength tuneable laser 907, does not itself generate the pulses of light that are output by the transmitter. Nevertheless, the light output by the first multimodal laser 903 is still used in generating the pulses that are output by the transmitter, as the light from the first multimodal laser 903 is used to seed the pulses of light output by the second multimodal laser 905.

Figure 10:
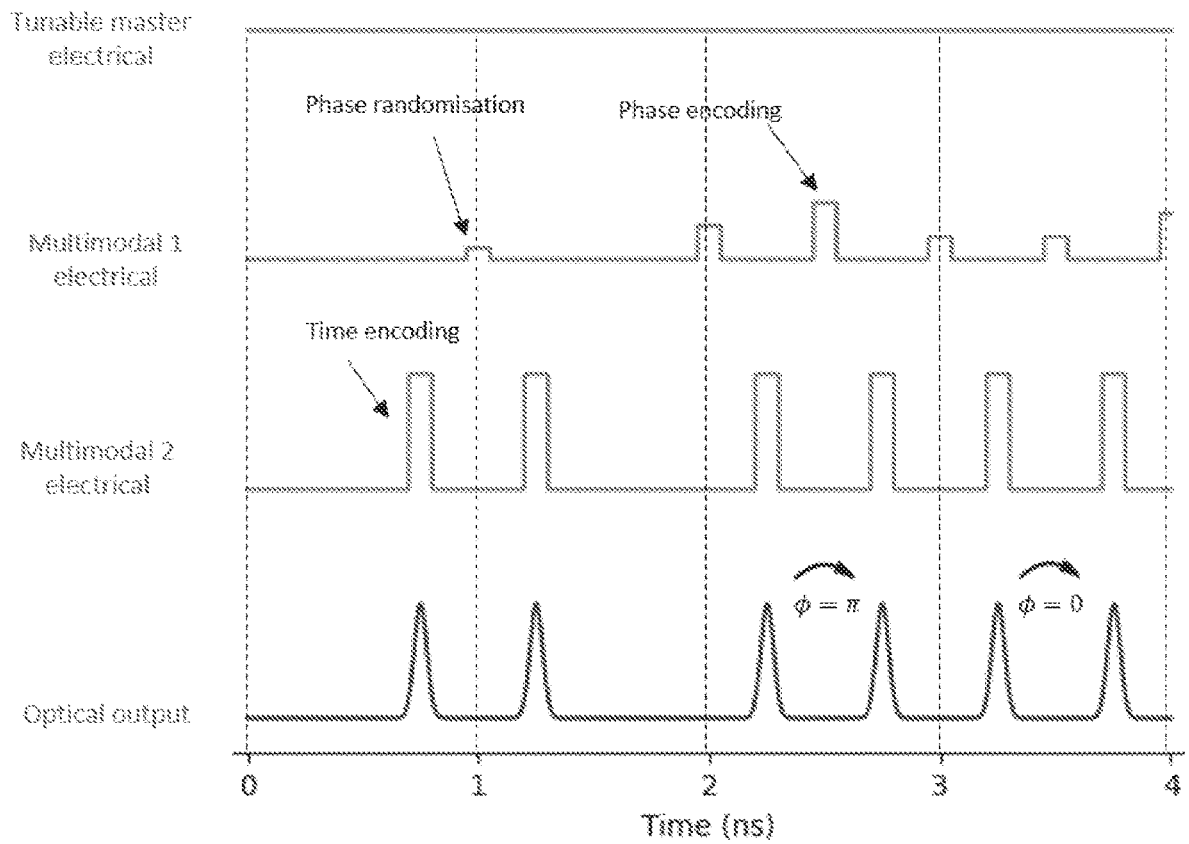
FIG. 10 shows an example of how the light pulses output by a transmitter may be used to encode temporal and/or phase information according to an embodiment.

FIG. 10 shows the encoding scheme for the optical transmitter of FIG. 9. The top line shows the (constant) DC bias supplied to the tuneable laser 907. The second and third lines show, respectively, the amplitudes of the electrical (pump) signal applied to the first multimodal laser 903 and the second multimodal laser 905. The fourth line shows the optical output of the second multimodal laser 905.

As before, a waveform generator or FPGA (not shown in the Figures) is used to generate a clock signal that defines the start of each time window. The clock signal is used to trigger the modulation in pump power applied to the first multimodal laser 903 and the second multimodal laser 905. The first multimodal laser 903 is pulsed at the clock rate, whilst the second multimodal laser 905 is pulsed at twice the clock rate. This means that within each time window, the second multimodal laser 905 can generate up to two pulses by gain switching, with each pulse from the second multimodal laser 905 being seeded by the light output by the first multimodal laser 903.

As in previous embodiments, the pulse(s) output in each time window are phase randomized with respect to the pulse(s) in the previous time window. In the present embodiment, this is achieved by applying a random modulation to the AC pump power of the first multimodal laser 903 at the start of each window. The modulation applied to the AC pump power acts to cause a change in the refractive index of the cavity of the first multimodal laser 903 and in turn causes a shift in the phase of light output by the first multimodal laser 903. Since the applied modulation has a random amplitude, the phase shift that results is also random. In addition, since the photons injected into the cavity of the second multimodal laser 905 laser by the first multimodal laser 903 cause the second multimodal laser 905 to seed via stimulated emission rather than spontaneous emission, the output of the second multimodal laser 905 will be coherent with that of the first multimodal laser 903; accordingly, the phase of the pulse(s) output by the second multimodal laser 905 in a respective time window will also be randomized with respect to the pulse(s) output by the second multimodal laser 905 in the previous time window.

Whilst the pulse(s) output within different windows will have random phases compared to one another, the relative phase of pulses within an individual time window can be controlled by again using the first multimodal laser 903. If a small modulation is applied to the pump power of the first multimodal laser 903 in the interval between the two pulses, the relative phase of light emitted by the first multimodal laser 903 will again be shifted due to a small change of the refractive index of the cavity of the first multimodal laser 903. Unlike the random modulation applied at the start of each window, however, the modulation that is applied in the interval between the laser pulses in the same time window can be carefully controlled so as to achieve a pre-defined shift in phase. In the example shown in FIG. 10, the modulation is used to obtain a phase shift of $\pi$ between the two pulses in the fourth time window.

Accordingly, by controlling the modulations applied to both the first multimodal laser 903 and the second multimodal laser 905, information can then be encoded into either two different phase differences, as seen in the time intervals 2 ns-3 ns and 3 ns-4 ns, or through a phase difference and time by switching off one of the two pulses from the second multimodal laser 905, as seen in the time intervals 0 ns-1 ns and 1 ns-2 ns.

The embodiment of FIG. 9 obviates the need for direct modulation of the tuneable laser. In addition, no external modulators are required; instead, the AC input to the first multimodal laser 903 acts to modulate the phase of the pulses output from the transmitter 900.

The embodiments described herein can provide a high-speed (MHz or GHz), widely wavelength tuneable compact pulse source that supports phase encoding. The described embodiments address the problems encountered with conventional QKD transmitters by providing a source that is both widely tuneable, and at the same time compact, without requiring a repeating sequence of intensity and phase modulators. Indeed, through pre-calibration of the optimal parameters for each wavelength, a range of wavelengths can be used for QKD. Alternatively, a feedback loop may be included to allow for in-situ optimization. Flexibility of the wavelength used to send information allows the same system to be used for both classical communication traffic and QKD, without fear that one with disrupt the other. In addition, embodiments provide potential for time multiplexing different users at different wavelengths, if the wavelength shift can be implemented quickly enough to send multiple users keys within a short time frame. For embodiments that do not rely on the presence of external phase modulators, the removal of those modulators enhances compatibility with photonic integration techniques, in turn providing opportunities to exploit chip-scale QKD.

Figure 11:
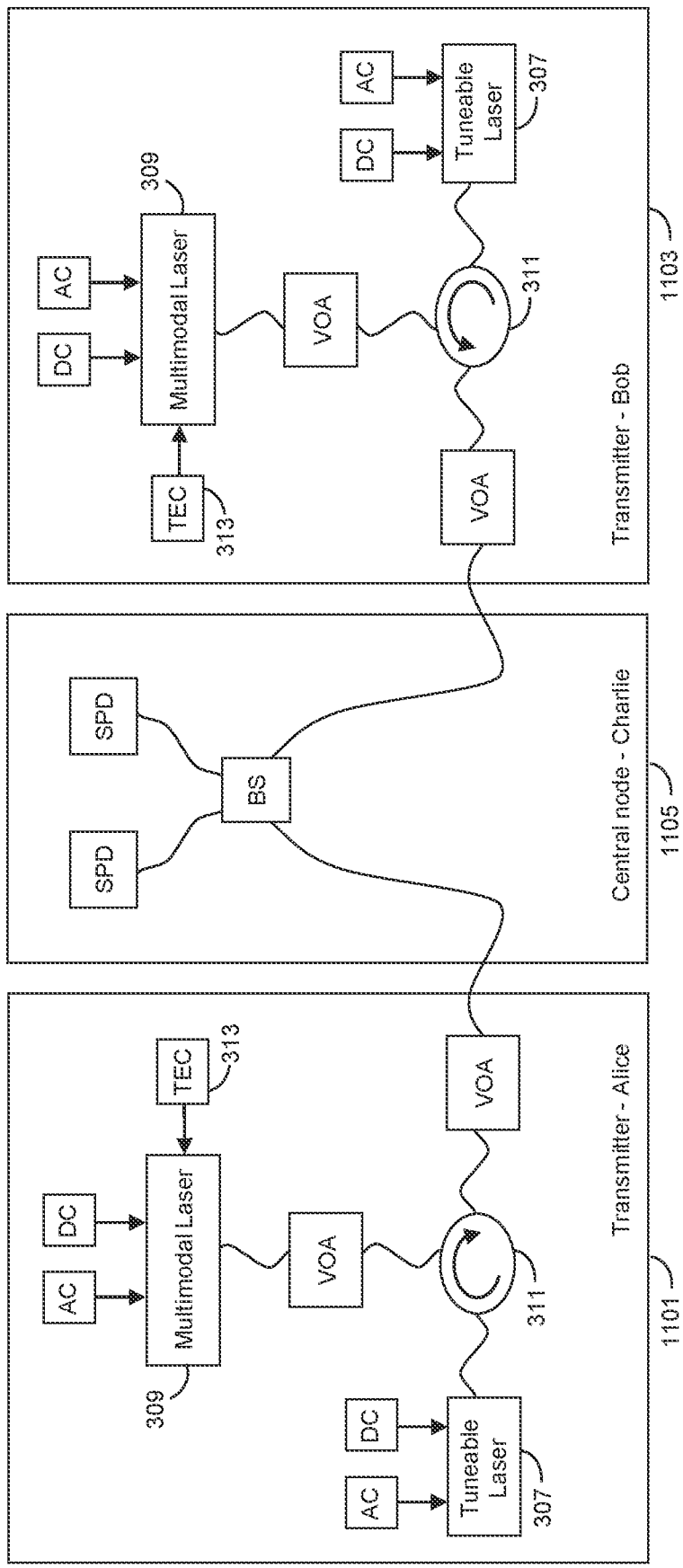
FIG. 11 shows a system having an MDI and Twin field QKD architecture and comprising a transmitter according to an embodiment.

In addition to being incorporated into point-to-point based QKD systems, embodiments described herein may also be used for a number of other QKD protocols including Measurement Device Independent (MDI) and Twin Field (TF) QKD. FIG. 11 shows an MDI and Twin field QKD architecture using a wavelength tuneable quantum channel. In the MDI case, the transmitters 1101, 1103 are tuned to the same wavelength and send photons to a central node 1105. At the central node 1105, two-photon interference occurs leading to post selection entanglement between the users. For TF QKD, single photon interference occurs at the central node 1105 leading to entanglement between users.

Figure 12:
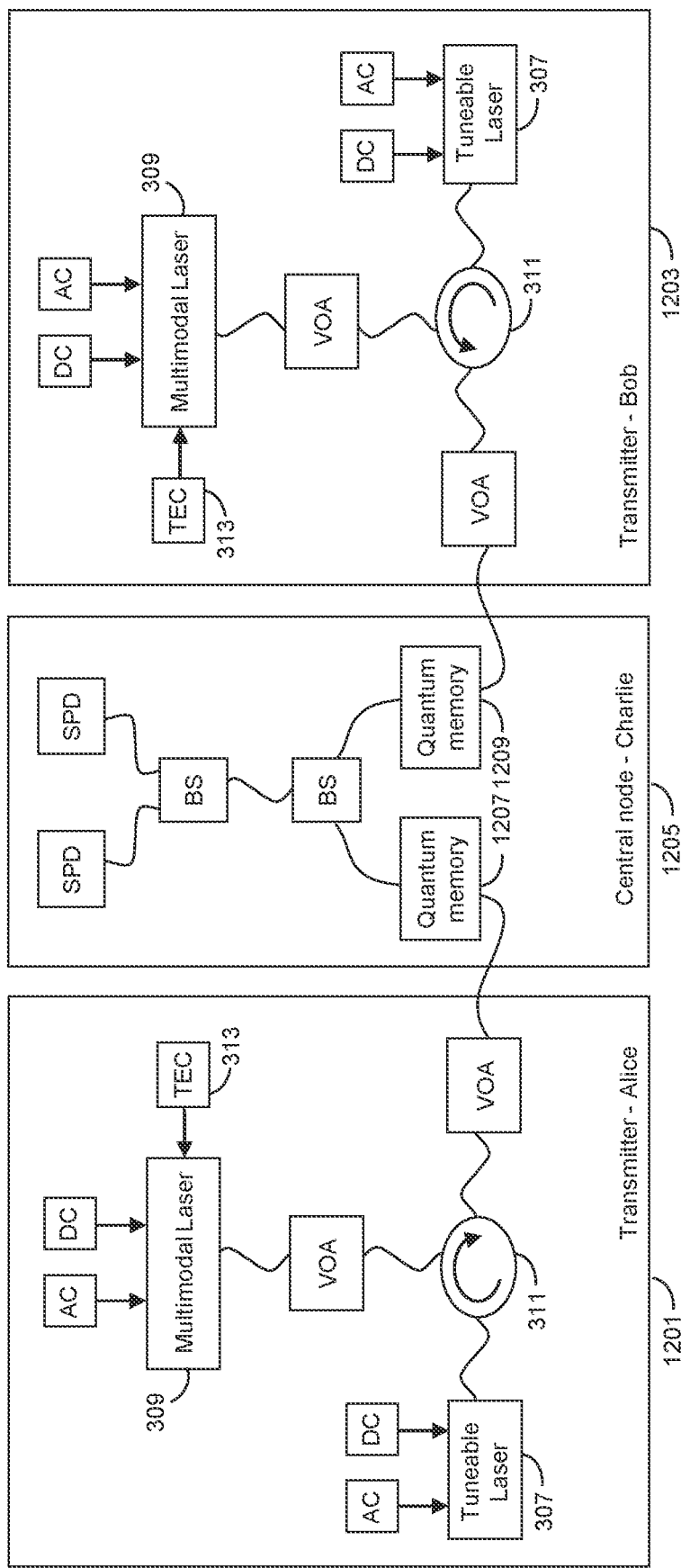
FIG. 12 shows a quantum repeater based QKD system comprising a transmitter according to an embodiment.

The ability to tune the wavelength of the transmitter also allows for the wavelength to be matched to the resonant excitation wavelength of a quantum memory. The memories can then be used to store the states and give flexibility on arrival time, an early quantum repeater. FIG. 12 shows a quantum repeater based QKD using two wavelength tuneable transmitters 1201, 1203 according to an embodiment. The transmitters are tuned to be resonant with the excitation of a quantum memory 1207, 1209.

Embodiments described herein may enable progress towards a quantum internet whereby pulses can be wavelength tuned to match the photonic output of a quantum device and entangled to the device through a Hong-Ou-Mandel technique. Embodiments may also be used as an excitation source for resonance fluorescence measurements of quantum dot/solid-state spin qubits.

Embodiments as described herein may be implemented in conjunction with decoy state protocol.

A tunable transmitter as described herein may also be used to achieve Quantum key distribution using the Coherent One-Way (COW) protocol. In this case, the modulator is set to maintain a constant (zero) phase shift between each pulse output by the transmitter, and all pulses output by the transmitter are coherent with each other.

The coherent-one-way (COW) protocol uses time-bin encoding to share a key between two users, Alice and Bob, by encoding into early or late time-bins relative to a clock signal. Alice maintains a fixed phase relationship between successive pulses. Bob can measure the interference visibility between adjacent pulses using an asymmetric Mach Zehnder interferometer (AMZI). A loss of interference visibility indicates the presence of an eavesdropper, Eve. In more detail, in the transmitter, time-bin pulses with a fixed phase relationship are prepared. At the receiver, the pulses are split between either direct detection for a time of arrival measurement, or passed into a Mach Zehnder interferometer and onto two detectors to measure the phase relationship between successive pulses. The interferometer is set such that one detector receives maximally constructive interference and one receives maximally destructive interference. Due to the fixed phase relationship between pulses, all interfered pulses should be sent to the one detector. Clicks on the other detector indicate that the signal has been disrupted and potentially eavesdropped upon in the transmission channel. A key is generated from the time of arrival measurements and interference measurements are used to ensure security. Although the COW protocol is not secure against the most general form of attack—coherent attacks—the COW protocol offers security against many types of attack and could be used in a chain of security measures.

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. An optical transmitter for a Quantum Key Distribution (QKD) system, the transmitter comprising:
   a multi-modal laser;
   a wavelength tuneable laser arranged to inject light into a cavity of the multi-modal laser, so as to cause the multi-modal laser to output light at a selected wavelength for use in generating pulses to be output by the transmitter; and
   a modulator for controlling a phase shift between successive pulses output from the transmitter,
   wherein the transmitter is configured to encode bits of information in pairs of optical pulses output by the transmitter, each pair of pulses being transmitted within a respective time window, wherein within each time window, the pair of pulses are phase encoded by applying a specified phase shift between the first pulse in the time window and the second pulse in the time window; and
   wherein the phase of the first pulse in a temporal window is randomised with respect to a previous time window.

2. An optical transmitter according to claim 1, wherein the multi-modal laser is configured to generate the pulses of light for output by the transmitter.

3. An optical transmitter according to claim 2, wherein the modulator is configured to control the phase shift by modulating pump power supplied to the wavelength tuneable laser.

4. An optical transmitter according to claim 2, wherein the modulator comprises an external modulator arranged to receive the pulses of light from the multi-modal laser and apply a phase shift to the pulses of light.

5. An optical transmitter according to claim 2, wherein the multi-modal laser is configured to generate pulses of light by modulating pump power supplied to the multi-modal laser.

6. An optical transmitter according to claim 5, wherein the pump power supplied to the multi-modal laser is used to gain-switch the multi-modal laser.

7. An optical transmitter according to claim 1, wherein the multi-modal laser and/or the wavelength tuneable laser are solid-state lasers; and
optionally wherein the multi-modal laser comprises a Fabry Perot laser.

8. An optical transmitter according to claim 1, further comprising an attenuator for attenuating the output pulses, such that a mean number of photons per pulse is equal to or less than 1.

9. An optical transmitter according to claim 1, wherein the information is encoded into conjugate bases of time and phase or two phase bases; and
optionally wherein the pulses output by the transmitter are temporally encoded within each time window by modulating pump power supplied to the multi-modal laser.

10. An optical transmitter according to claim 1, wherein the specified phase shift is applied by modulating pump power supplied to the wavelength tuneable laser by a pre-defined amount; or
wherein the optical transmitter comprises an interferometer configured to split each pulse generated by the multi-modal laser into two pulses that travel down respective arms of the interferometer, wherein one of the arms comprises a delay for delaying one of the pulses with respect to the other pulse, and
wherein one of the arms comprises a phase modulator arranged to apply a phase shift to the pulse travelling down that arm.

11. An optical transmitter according to claim 1, wherein the phase of the first pulse in each time window is randomised with respect to the previous time window by gain switching the wavelength tuneable laser.

12. An optical transmitter according to claim 1, wherein the phase of the first pulse in each time window is randomised with respect to the previous time window by modulating pump power supplied to the wavelength tuneable laser with a randomly chosen amplitude; and
optionally wherein the randomly chosen amplitude is selected from one of 10 or more pre-defined amplitudes.

13. A quantum key distribution (QKD) system comprising an optical transmitter according to claim 1.

14. A QKD system according to claim 13, comprising a receiver, wherein data is sent from the transmitter to the receiver across a network, the network comprising one of:
a point-to-point network;
a measurement device independent (MDI) network; and
a twin field (TF) network; and
optionally wherein a different wavelength is selected at different time intervals.

15. A QKD system according to claim 13, further comprising a quantum repeater, the quantum repeater comprising a node having a quantum memory, the quantum memory being arranged to receive pulses of light output by the optical transmitter, wherein the selected wavelength is such as to match resonant excitation of the quantum memory.

16. A QKD system according to claim 15, wherein the system comprises two optical transmitters, the quantum memory being arranged to receive the pulses of light output by both optical transmitters, each of the optical transmitters being configured to output pulses of light at the same selected wavelength.

17. A QKD system according to claim 13, wherein the pulses output by the optical transmitter are transmitted through the same network as light signals encoding other telecommunications data, the selected wavelength being different from the wavelength of the light signals encoding the other telecommunications data; and
optionally wherein the QKD system is multiplexed with other QKD systems.

* * * * *